Dec. 25, 1928.

D. N. BOOTH 1,696,707

VEHICLE TIRE

Filed Sept. 5, 1925

Inventor
David N. Booth
By his Attorneys

Dec. 25, 1928.

D. N. BOOTH

VEHICLE TIRE

Filed Sept. 5, 1925

Inventor
David N. Booth
By his Attorneys

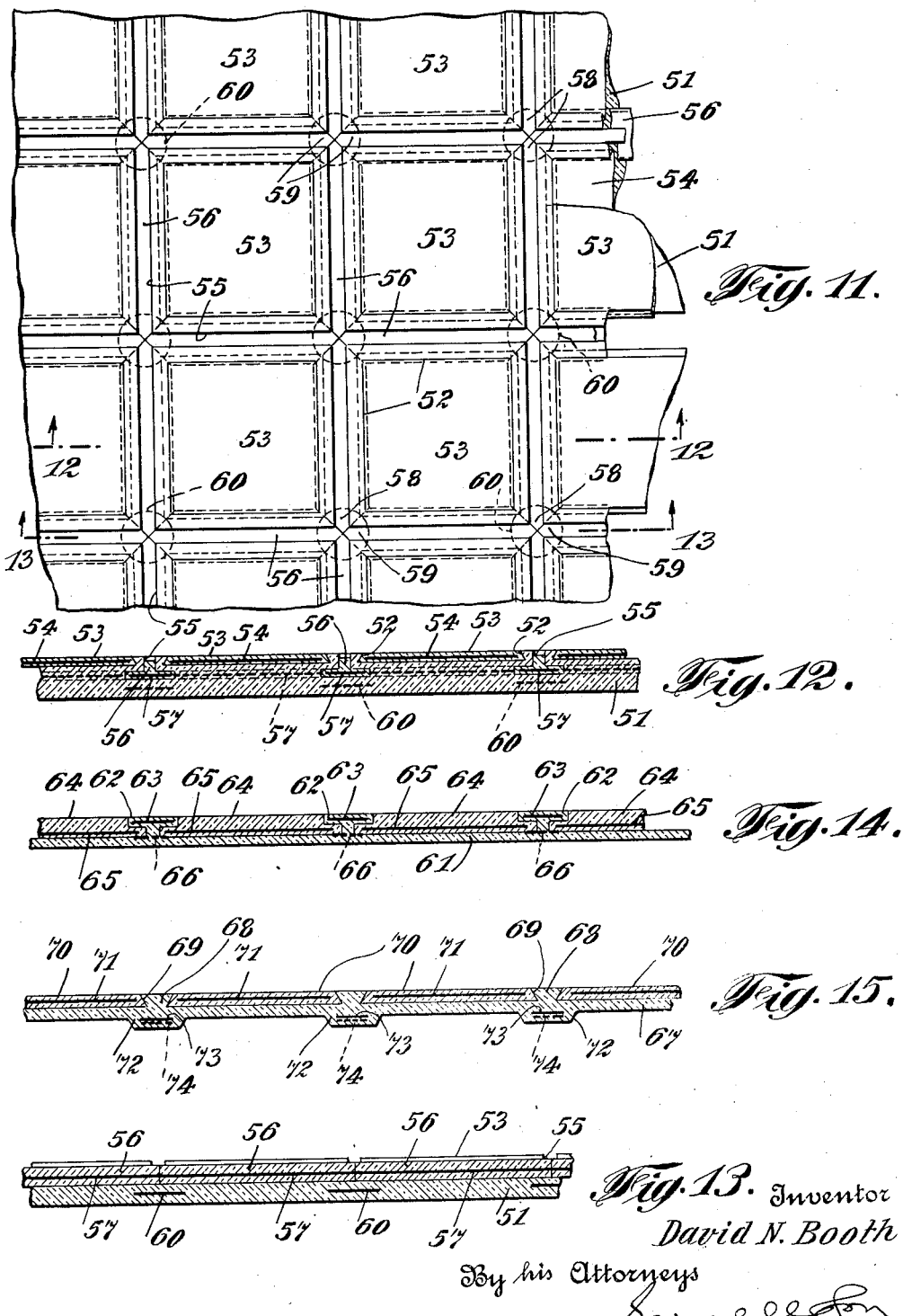

Patented Dec. 25, 1928.

1,696,707

UNITED STATES PATENT OFFICE.

DAVID N. BOOTH, OF NEW YORK, N. Y.

VEHICLE TIRE.

Application filed September 5, 1925. Serial No. 54,668.

My present invention relates to an improvement in vehicle tires and more particularly to resilient tires adapted for use in pleasure cars, trucks and similar motor vehicles. As commonly constructed at the present time the tires employed for this purpose usually include an inner tube and a shoe which by various devices are demountably or otherwise fixed on the felly of the wheel of the vehicle. Tires of this type have also been made of a size and with the walls of the shoe constructed in a predetermined manner to carry a relatively low pressure and to provide for an increased resiliency such for example as the so-called balloon tires of more or less recent date. I am also aware that heretofore armor devices of various structures have been applied to vehicle tires in attempts to make them puncture proof.

In the practical use of vehicle tires it is necessary when a tire becomes punctured to stop the vehicle and change the tire, because as it is well understood, running on a flat tire not only ruins the shoe and the tube, but also tends to unduly strain the operating parts of the vehicle. Stopping to change a shoe is not only a means of inconvenience but oftentimes causes delays which are exasperating in the extreme. The object of my invention is to overcome these inconveniences and difficulties, making it possible to use a tire which may be made substantially puncture proof, and which if deflated because of a faulty valve or otherwise, the vehicle may be run sufficiently far to reach a garage or repair station without material injury to the tire or detriment to the operating parts of the vehicle. To this end in carrying out the invention, the tire made in accordance therewith preferably comprises a plurality of tubes and a shoe surrounding the same. The tubes are so arranged within the shoe as to be suitably spaced from each other and adapted to be inflated to various pressures, the pressure for example in the innermost tube being appreciably greater than the pressure in the outermost tube, whereby as will be understood, there will be a materially increased resiliency in the tire, and should the outermost tube become punctured the shoe will be carried by the inner tube or tubes until the necessary repairs may be made. The invention also includes the provision of an armor for making the tire substantially puncture proof, the armor being associated in any one of a number of manners, some of which will be hereinafter more particularly described in conjunction with an armor which I now believe is the preferred form thereof.

In the drawing Figure 1 is an elevation and partial section of a vehicle tire including the wheel made in accordance with my invention.

Fig. 11 is a partial plan illustrating a form of armor which may be employed in carrying out my invention.

Fig. 12 is a section on line 12—12, Fig. 11.

Fig. 13 is a section on line 13—13, Fig. 11.

Fig. 14 is a section illustrating a slightly modified form of armor, and

Fig. 15 is a section illustrating a further modified form of armor.

Figure 1:
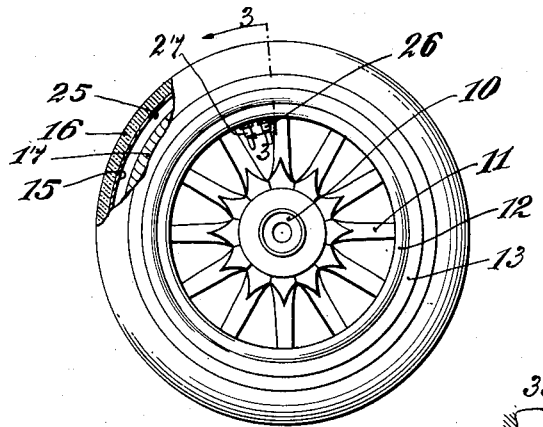
Figure 2:
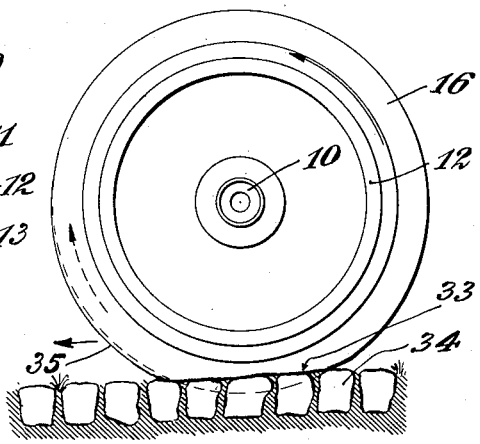
Fig. 2 is a diagrammatic elevation illustrating the use of the improved tire.
Figure 3:
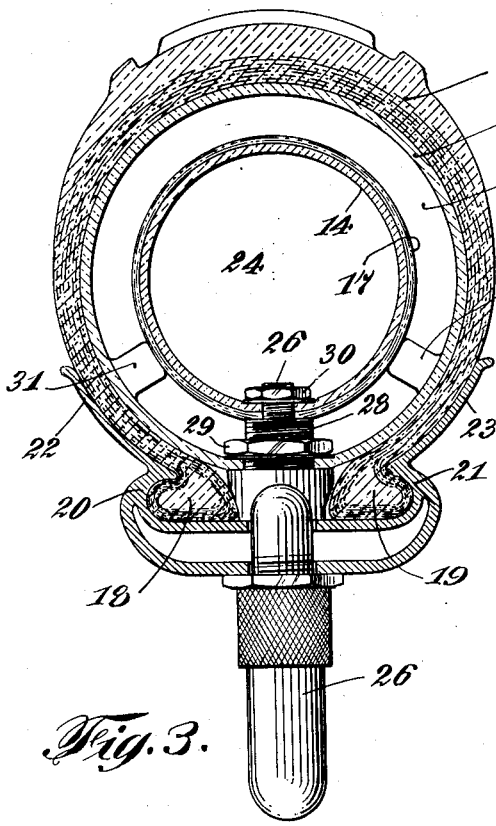
Fig. 3 is an enlarged section on line 3—3, Fig. 1.

Referring to the drawings and particularly to Figs. 1, 2 and 3, the vehicle tire made in accordance with my invention is adapted to form part of a vehicle wheel constructed to include a hub 10, spokes 11 and a felly 12. It will be understood however, that a disk type or other form of wheel may be employed to equal advantage and with the same facility. It will also be understood that irrespective of the type of wheel the same may include any style of rim to which the tire is attached, as for example a demountable rim 13 which is secured to the felly in any desired manner.

Figure 5:
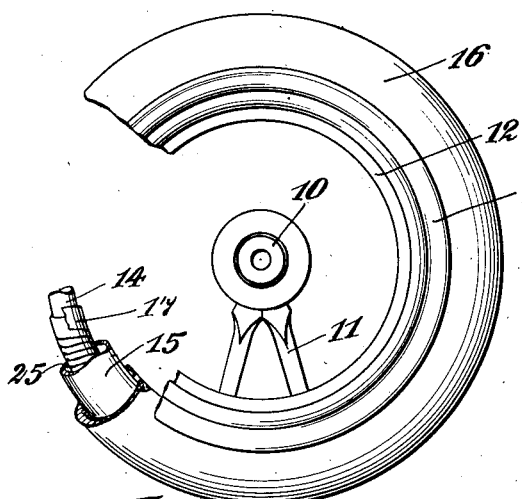
Fig. 5 is an elevation and partial section illustrating the construction of the tire as shown in Figs. 1 and 3.

The tire made in accordance with my invention as illustrated for example in Figs. 1, 3 and 5, preferably includes an inner tube 14 made of rubber or other similar and equally flexible material. The tire also includes an outer tube 15 which is also made of rubber or other similar flexible material and adapted to fit within a shoe member 16 constructed in the usual or any desired manner. As illustrated the inner tube 14 is provided with a cover or sleeve 17 of substantially inexpansible material such for example as canvas, cotton duck or the like, to determine and limit the extent to which the inner tube when in use may be expanded, due the pressure of the air or other gas contained therein. The shoe as illustrated may be provided with the usual beads 18 and 19 adapted to engage in recesses 20 and 21 provided for this purpose in the rim, and the rim may be provided with laterally extending flanges 22 and 23 against which the outer adjacent surfaces of the shoe contact when in use. These flanges may be of approximately the extent indicated or any other extent which may be found necessary or desirable.

The inner tube 14 provides for an air or gas space 24, and between the inner tube 14 and its cover 17 and the outer tube 15, there is an annular space 25 also adapted to receive and contain air or other gas under pressure. The air or gas is admitted to the space 24 by a valve 26 and to the annular space 25 by a valve 27. These valves may be of the usual construction and as illustrated, the stem 28 for example of the valve 26 passes through the rim and is secured in the usual or any manner in both the inner tube 14 and the outer tube 15. As shown, there is a lock nut 29 adapted to turn down on the threaded end of the stem against the inner surface of the tube 15, and a nut 30 adapted to be turned down on the reduced screw threaded end of the stem against the inner surface of the tube 14. In this form of tire the inner tube 14 may be inflated to contain a predetermined pressure, for example 70 to 75 pounds, and the outer tube inflated by passing air or other gas into the space 25 at a reduced pressure, for example 50 to 60 pounds, so that the pressure in the annular space is preferably less than the pressure in the inner tube. This as will be understood provides for a greater resiliency of the shoe than would otherwise be obtained, that is the shoe is more resilient than if the pressures within the same were higher, and for example equal to the pressure in the inner tube. In the use of the tire as shown in Fig. 2, the bearing surface of the tread on the surface of the road is materially increased, providing for a greater friction between the tire and the road surface tending to prevent skidding and increasing the driving power due to the greater purchase on the road. This action tends to provide a bulging effect in advance of that portion of the tread which is in contact with the road. It will also be understood that if for any reason the outer tube 15 becomes deflated, the inner tube 14 will provide sufficient support for the outer tube and the shoe to make it unnecessary to stop and change the shoe, certainly until a suitable place as a garage or repair station may be reached where this work can be conveniently done. As illustrated in the drawing, it may be advisable to provide a series of staggered lugs 31 and 32 extending between the inner and outer tubes, and preferably within the confines of the rim and its flanges. Also as illustrated, the contact between the shoe and the road is designated at 33, 34 indicating the road bed, while the bulging portion of the tire in advance of its contact with the road bed is indicated at 35, reference being made to Fig. 2 of the drawing.

Figure 4:
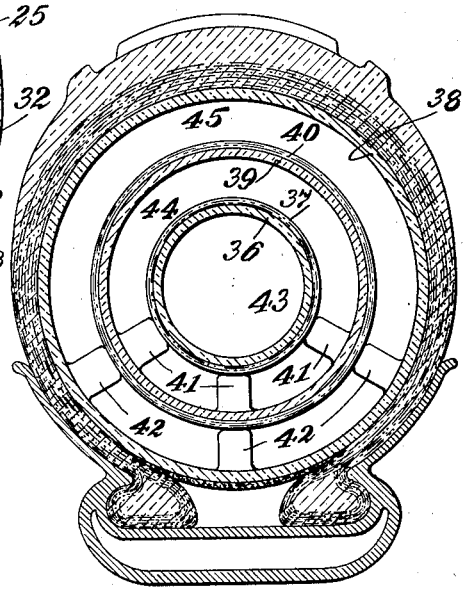
Fig. 4 is also a section showing another form of the invention.
Figure 6:
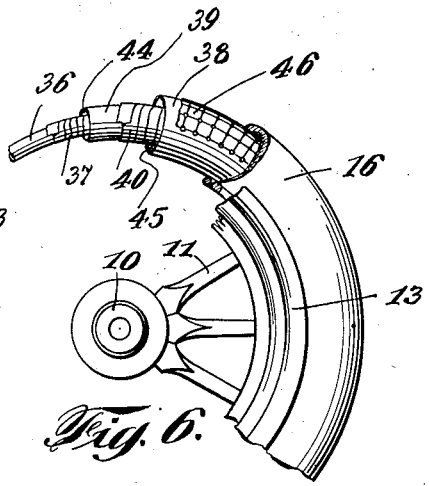
Fig. 6 is a similar view showing the construction of the tire as illustrated in Fig. 7.

Referring to Figs. 4 and 6, the tire made in accordance with my invention may be constructed to include an inner tube 36 made of rubber or other similar flexible material and provided with a cover or sheath 37 of inflexible material; an outer flexible tube 38 adapted to contact with the shoe and an intermediate flexible tube 39 also fitted with a cover or sheath 40 of inflexible material. These tubes like those hereinbefore described are preferably arranged concentric of one another within the shoe and within the confines of the flanges of the rim, are provided with series of lugs 41 and 42 which are preferably arranged in a staggered relationship. The lugs 41 lie between the inner tube 36 and the sheath 37 and the intermediate tube 39, while the lugs 42 lie between the outer tube 38 and the intermediate tube 39 and its cover 40. In this form of the tire there is a space 43 within the inner tube which may be inflated to a predetermined pressure, for example a pressure of 70 to 75 pounds; between the inner tube 36 and the intermediate tube 39 there is an annular space 44, which for example may contain air or other gas to a pressure of 55 to 60 pounds; while between the intermediate tube 39 and the outer tube 38 there is an annular space 45 adapted to contain air or other gas at a still lower pressure, for example 45 to 50 pounds per square inch. In this form of the tire there is therefore, a still greater resilient effect and this resiliency is maintained to a predetermined extent if for any reason the outer tube becomes deflated, that is if the pressure in the annular space is materially decreased, the outer tube and the shoe are carried by the intermediate tube 39. Furthermore in the event of both the spaces 44 and 45 becoming deflated for any reason, the entire shoe will be carried by the inner tube until such a time as suitable repairs or shifting of the tire may be conveniently made.

Figure 9:
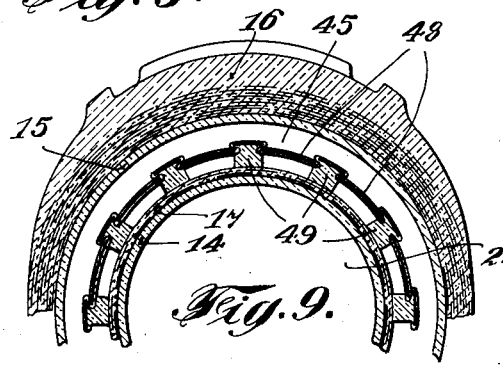
Fig. 9 is a section showing the use of an armor substantially midway between the inner and outer tubes of a tire as illustrated in Fig. 3.
Figure 7:
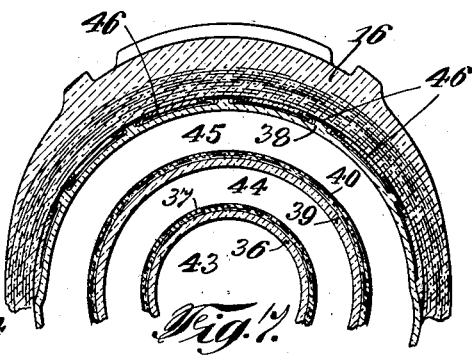
Fig. 7 is a partial section illustrating one manner in which the armor may be applied to the form of tire illustrated in Fig. 4.
Figure 10:
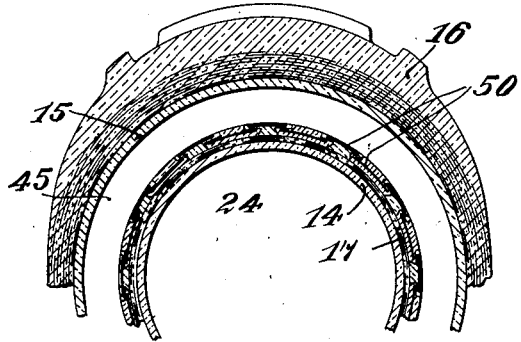
Fig. 10 is a section showing the use of an armor applied to the inner tube of a tire of the construction shown in Fig. 3.
Figure 8:
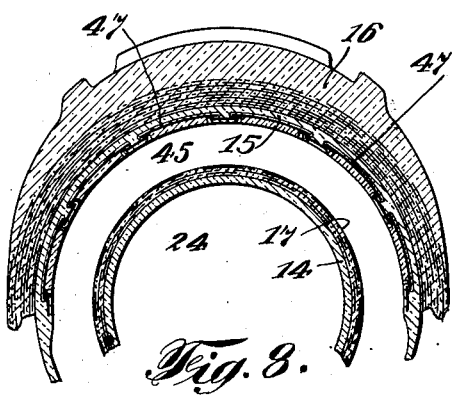
Fig. 8 is a section showing another manner in which the armor may be applied to a tire constructed as shown in Fig. 3.

In addition to providing for the increased resiliency of the tire in carrying out the invention, I may also employ an armor which makes the same substantially puncture proof. The armor will be hereinafter more particularly described. This armor may be employed in any one of a plurality of manners, for example as illustrated in Fig. 7, the armor which is designated at 46 may be associated with or made as an integral part of the outer tube 38 in the form of tire shown in Fig. 4, so that the armor lies between the outer tube 38 and the inner surface of the shoe. As illustrated in Fig. 8, the armor which is designated at 47 may be placed on the inner side of the outer tube 15 in the form of the tire as illustrated in Fig. 3, the armor being associated with or made an integral part of this outer tube 15. Then again as shown in Fig. 9, the armor which is indicated at 48 may be placed so as to assume an approximately central position in the annular space 45 of a tire constructed as shown in Fig. 3. In this structure as will be apparent, the armor lies intermediate of the outer tube 15 and the cover or sheath 17 of the inner tube 14 and is preferably provided with a series of lugs or projections 49 bearing against the cover or sheath 15 to maintain the armor in its position in the annular space 45. Then again as shown in Fig. 10, the armor which is indicated at 50 may be associated with the inner tube 14 and its cover or sheath 17 in the form of the tire as illustrated in Fig. 3. In this structure for example, the armor is preferably constructed so as to be independent of but to conform to and to contact with the outer surface of the cover or sheath 17. It will furthermore be understood that the illustrations shown in Figs. 7, 8, 9 and 10 are more or less diagrammatic, and that these or other variations of the manner in which the armor may be associated with various parts of the tire may be employed without departing from the nature and spirit of the invention.

As illustrated in Figs. 11, 12 and 13, the form of armor which I prefer to employ preferably comprises a band 51 made of material sufficiently resilient for its intended use and shaped to conform to the parts of the tire with which it may be associated. The band or body of the armor is indicated at 51 and as shown is provided in predetermined positions in one surface thereof with series of recesses 52. In the form of the invention as shown, these recesses extend both transversely and circumferentially of the body of the armor, and have the edges thereof undercut or beveled. The form of the recesses however, may be varied as may be necessary or desirable in different uses of the armor. In any event, each of these recesses 52 is adapted to receive a correspondingly shaped plate 53 embodied in which is a reinforcing member 54 made of metal or other similar substantially puncture proof material. In this form of the armor the sections in which the recesses for the plates are formed are determined by series of undercut grooves 55, these grooves extending both transversely and longitudinally of the body of the armor and opening in the outer face thereof. Fitted in each of these grooves is a plurality of reinforced members 56, which are intermediate of the plates 53. Each of these members 56 is provided with a metal reinforcing member 57, the extent of which is sufficient to be coincident with or to overlap the edges of the reinforcing members 54 in the adjacent plates 53. The ends of these members are preferably made in angular conformation as indicated at 58 and 59 so as to abut against each other at the intersections of the undercut grooves 55, whereby the entire area of the armor is reinforced so as to be substantially puncture proof. However, in order to provide against possible punctures at the intersections of the undercut grooves, I prefer to employ additional reinforcing members preferably in the form of disks 60, which are suitably embedded in the body of the armor at the intersections of these undercut grooves. This form of armor is therefore, flexible and sufficiently resilient to make the insertion of the plates 53 readily possible, it being understood that the members 56 are made of just as resilient material as the body of the armor.

In Fig. 14, I have illustrated a slightly modified form of armor which may be employed with the vehicle tire hereinbefore described. In this construction the body of the armor is indicated at 61. In one surface thereof, this is provided with transversely extending series of flanges 62. These flanges are fitted with reinforcing members 63 and are adapted to receive and maintain in position intermediately placed plates 64, each of which is fitted with a reinforcing member 65. At each of the intersections of the flanges 62 I may provide an additional reinforcing member 66.

In Fig. 15, I have illustrated a further somewhat modified form of armor in which the flexible and resilient body member or band is illustrated at 67. In one side of this band there is provided series of transversely extending ribs 68 which are preferably undercut as indicated at 69, and are adapted to receive and maintain in position the plates 70, each of which is reinforced as indicated at 71. On the opposite side of the body or band of the armor in this construction there are ribs 72 conforming in outline, that is the direction in which they run to the ribs 68. In each of these ribs there is a reinforcing member 73 and at the intersections of each of the ribs there is an additional reinforcing member 74. It will also be understood that while I have herein shown and described various forms of armor, that other and equally obvious forms may be employed without departing from the nature and spirit of the invention.

As hereinbefore stated, the extent and configuration of the plates 53 and the members 56 and their reinforcing devices are herein illustrated only diagrammatically, as these parts may be made in many other forms and configurations. Furthermore, I wish particularly to point out that the resiliency of the armor is due not only to the material of which the body thereof is composed, but also to the construction in which the reinforcing devices of the plates 53 and the reinforcing devices of the intermediate members 56 lie in different planes, so that irrespective of the extent of these reinforcing devices there is always a resilient portion of the body of the armor between their adjacent edges. Still furthermore, the disks 60 employed as additional reinforcing devices at the meeting edges or points of the intermediate members are also in a plane different to that in which the reinforcing devices of the plates 53 and the intermediate members lie, so that in any event, irrespective of the form and configuration of these members, the reinforcing devices lie in different planes, whereby there is always a portion of the resilient body member between the said reinforcing devices. This as will be readily appreciated is the means of materially increasing the resiliency of the armor as a whole.

I claim as my invention:

In a vehicle tire, an expansible outer tube, an expansible inner tube concentric therewith, a substantially inexpansible cover extending immediately around the exterior of the inner tube to limit the expansion thereof to a diameter appreciably smaller than the inner diameter of the outer tube providing an annular space between the tubes, means for inflating the inner and outer tubes whereby the pressure in the inner tube is appreciably greater than that in the space between the tubes, series of lugs connected to the outer tube and normally extending between the same and the inner tube and its cover to position the said inner tube and its cover, and a shoe surrounding the outer tube.

Signed by me this 8th day of August, 1925.

DAVID N. BOOTH.